United States Patent [19]
Camezon

[11] Patent Number: 6,135,319
[45] Date of Patent: Oct. 24, 2000

[54] BRIX DETERMINING APPARATUS

[76] Inventor: Ray Camezon, P.O. Box 2526, Danville, Calif. 94526

[21] Appl. No.: 09/416,816

[22] Filed: Oct. 12, 1999

[51] Int. Cl.⁷ ........................................................ B67D 5/08
[52] U.S. Cl. ................................. 222/52; 222/55; 222/61; 222/129.1; 222/146.5; 222/145.5; 222/145.7
[58] Field of Search .................................. 222/52, 55, 61, 222/146.5, 129.1, 145.5, 145.6, 145.7; 73/861.38

[56] References Cited

U.S. PATENT DOCUMENTS

| | | |
|---|---|---|
| 4,708,266 | 11/1987 | Rudick . |
| 5,072,853 | 12/1991 | Shannon . |
| 5,656,313 | 8/1997 | Gibeny et al. .................. 73/861.38 |
| 5,730,324 | 3/1998 | Shannon et al. . |
| 5,749,494 | 5/1998 | Wolski et al. . |
| 5,797,519 | 8/1998 | Schroeder et al. . |

Primary Examiner—Kevin Shaver
Assistant Examiner—Thach Bui
Attorney, Agent, or Firm—Theodore J. Bielen, Jr.

[57] ABSTRACT

An apparatus for determining Brix utilizing a liquid sugar or syrup and a water or water based liquid stream. The apparatus includes a conduit for the water, a conduit for the sugar syrup, and a third conduit connected to the first and second conduits for use as a mixture stream of the syrup and the water. Pressure is applied to the sugar syrup in the first conduit and the water in the second conduit. The pressure of the water in the second conduit is predetermined to equal or lie at a greater value than the pressure applied to the sugar in the first conduit. A regulating mechanism is found in the third conduit for setting a value of the Brix of the mixture stream, detecting the actual Brix concentration, and a valve adjustment to the water stream responsive to a differential between the actual and set values of Brix in the mixture stream.

13 Claims, 3 Drawing Sheets

BRIX DETERMINING APPARATUS

BACKGROUND OF THE INVENTION

The present invention relates to a novel and useful Brix determining apparatus utilizing a sugar syrup and water stream.

Foodstuff such as beverages, juices, fruits, vegetables, and like mixtures are normally possess a predetermined degree of sweetness, referred to as Brix. Such sweetened liquids may be consumed directly, sold as a concentrate for later dilution, added to canned fruits or vegetables, or the like.

In the past, Brix controllers have utilized a valve arrangement to accurately control flow rates of syrups and other components having a water base. In addition, mixing vats or tanks have been employed in batch or continuous processes to achieve the same result. Prior systems have proven to be quite expensive and generally inaccurate, since maintaining accurate flow rates, and the Brix value of the sweetener component have proven difficult to maintain within stringent tolerances. Consequently, prior system have produced output streams of liquids at a Brix level higher than targeted levels, to avoid Brix deficiencies. Unfortunately the production of output streams of liquids at higher than necessary Brix levels is quite expensive, since the syrup or liquid sugar component is a costly entity.

U.S. Pat. Nos. 4,708,266, 5,749,494, and 5,797,519 describe beverage concentrate mixing systems in which the final mixed beverage or juice is determined by flow rates and valving arrangements.

U.S. Pat. No. 5,730,324 shows a syrup dispensing method and system for a beverage having the reservoirs employed to dispense syrup to multiple drink dispensing units with the addition of gas, as well as valve means for regulating the flow rates of the same.

U.S. Pat. No. 5,072,853 utilizes a Brix setting mechanism which is based on flow rates as a function of time between a probe and a dispensing head. Brix is adjusted by adjusting the time period between these two points to determine Brix in a soft drink at a desired level.

A Brix determining apparatus for a syrup and water which is accurate and reliable would be a notable advance in the food processing industry.

BRIEF SUMMARY OF THE INVENTION

The present invention relates to a novel and useful Brix determining apparatus.

The apparatus of the present invention utilizes a source of liquid sugar or syrup and a source of water based liquid or water. The syrup is passed through a first conduit while the water is passed through a second conduit. A third conduit is connected to the first and second conduits to provide a mixture stream of the syrup and the water. Both the syrup and the water may be fed from a reservoir at an elevated position to produce a pressure head in the first and second conduits. Also, a pump may be employed with the first and second conduits to deliver the syrup and water at a particular pressure. Both streams may be heated to decrease viscosity. Valves may be employed to adjust the pressure in the first and second conduits to an acceptable level.

The first and second conduits flow into the third conduit, the mixture stream. The pressure of the syrup in the first conduit is determined to be equal to or at a lower level than the pressure in the second conduit carrying the water. In this manner, syrup is prevented from flowing along the second conduit and mixing is promoted at the meeting place or node of the first and second conduits. Moreover, static mixers may be found in the third conduit to further mix the syrup and water prior to egress from the third conduit for commercial employment of the mixture.

The apparatus of the present invention also includes means for setting a particular Brix value of the mixture stream containing the syrup and water. Means is also employed for detecting the actual value of the Brix of the mixture stream. Comparitor means acquires the differential between the desired value of Brix and the actual value of Brix and regulates the flow of the water stream to zero out or eliminate such differential. The comparitor means may be a pneumatically operated control valve located on the second conduit containing the water. Likewise, the means for detecting the actual value of the Brix in the mixture stream may be a refractometer or like instrument.

It should be apparent that a novel and useful apparatus for determining Brix in a sugar syrup and water mixture stream has been heretofore described.

It is therefore and object of the present invention to provide an apparatus for determining the Brix in a syrup and water stream which eliminates the needs for mixing tanks.

Another object of the present invention is to provide an apparatus for determining the Brix in a mixture stream of sugar syrup and water which does not require the accurate determination of flow rates of the various streams.

A further object of the present invention is to provide an apparatus for determining the Brix in a mixture stream of sugar syrup and water which is highly accurate and compact in size.

A further object of the present invention is to provide an apparatus for determining the Brix in a mixture stream of syrup and water which results in elimination of waste of the syrup component and, thus, provides greater economy in the processing of syrup and water mixtures.

Another object of the present invention is to provide an apparatus for determining the Brix in a mixture stream of sugar syrup and water which provides single point blending of sugar concentrates with water or other fruit juices in a continuous manner, rather than the batch or continuous batch methods used in the prior art.

A further object of the present invention is to provide an apparatus for determining the Brix in a mixture stream of sugar syrup and water which may be remotely monitored and is relatively simple to operate.

The invention possesses other objects and advantages especially as concerns particular characteristics and features thereof which will become apparent as the specification continues.

For a better understanding of the invention reference is made to the following detailed description of the preferred embodiments thereof which should be taken in conjunction with the prior described drawings.

DETAILED DESCRIPTION OF THE PREFERRED EMBODIMENTS OF THE INVENTION

Various aspects of the present invention will evolve from the following detailed description of the preferred embodiments thereof which should be referenced to the hereinbefore described drawings.

Figure 1:
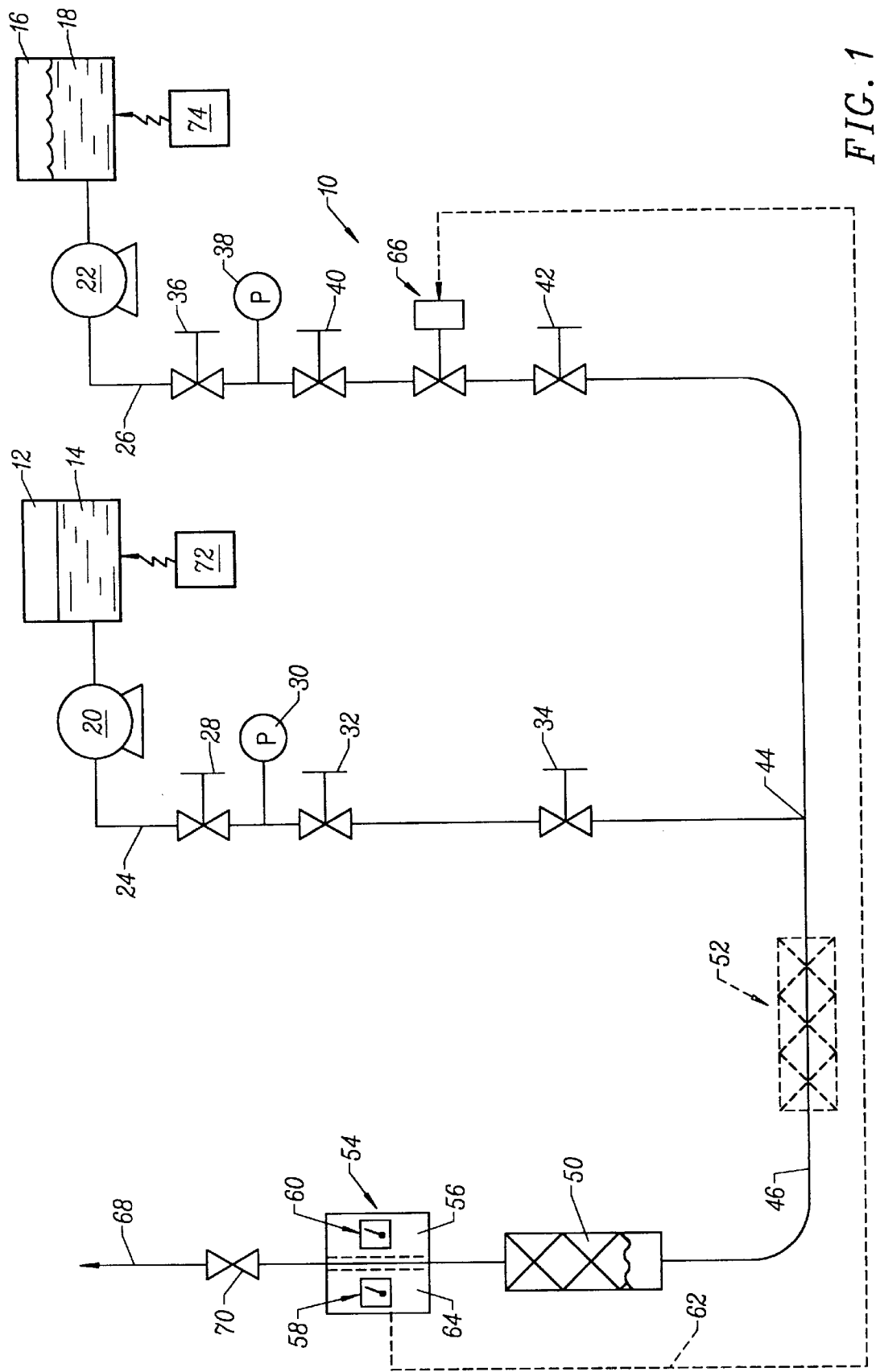
FIG. 1 is a schematic view of the apparatus of the present invention.

The apparatus of the present invention as a whole, is depicted in the drawings by reference character 10. FIG. 1 schematically depicts apparatus 10 in which a container 12 is employed for the liquid sugar component 14. The liquid sugar component 14 may be a syrup such as sucrose derived from sugar cane or sugar beat sources. In addition, the liquid sugar component 14 may comprise fructose, including high fructose sugar derived from corn. Other sugar syrups may be employed. Typically, the liquid sugar component 14 lies at a high Brix level, at or exceeding 70 degrees Brix. Correspondingly, container 16 holds the water or water based liquid 18, which is to be mixed or blended with the liquid sugar component 14. Liquid sugar component 14 and water based liquid 18 are delivered to system 10 under pressure. Such pressure may derive from a gravity feed or by other means of inducing a pressure in the present embodiment. Pumps 20 and 22 are depicted, in this regard for boosting the pressure of liquid sugar component 14 and water base liquid 18, respectively. Stream 24 represents the liquid sugar and stream 26 represents the water base liquid deriving from containers 12 and 16, respectively. Additionally heaters 72 and 74' may be employed to elevate the temperature of the liquid sugar component 14 and the water based component 16.

Liquid sugar stream 24, which may be a syrup, passes through a pressure reducing valve 28. Valve 28 adjusts the pressure of stream 24, indicated by pressure gage 30. Shut off valves 32 and 34 provide additional control to syrup stream 24.

Figure 3:
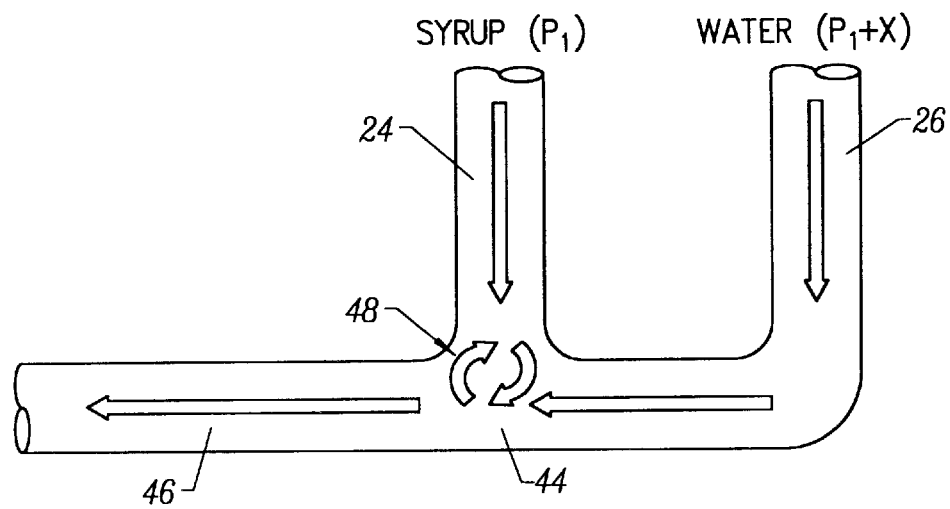
FIG. 3 is a schematic enlarged portion of the present invention depicting the meeting of the water, syrup concentrate, and mixture streams.

Turning to water base component stream 26, it may be observed that pressure reducing valve 36 is employed and provides a reading at pressure gage 38. Again, shut off valves 40 and 42 are employed to further control water based liquid stream 26. It should be noted that the pressure of water based liquid stream 26 is intended to be at a higher level than the pressure of liquid sugar stream 24, which will be described in greater detail hereafter. Liquid sugar stream 24 and water based liquid stream 26 meet at node 44. Turning to FIG. 3, it should be observed that node 44 is depicted in greater detail. Syrup or liquid sugar stream 24 meets water based liquid or water stream 26 at node 44, a Y-type piping arrangement, creating a product or mixture stream 46 which eventually passes to a product container. Directional arrows 48 represent theoretical mixing action which takes place at node 44. Most importantly, syrup stream 24 does not pass along the conduit associated with water based liquid stream 26, since the water stream 26 is preferably kept at a higher pressure ($P_1+X$) than the liquid sugar or syrup stream 24 ($P_1$). For example, such pressure difference may be about 5 psi. However, in certain cases the pressure of the liquid sugar stream 24 may equal the pressure of the water stream 26.

After passage through node 44, the mixture stream 46 travels through static mixture. A second static mixture is depicted in FIG. 1 in phantom if additional mixing is required. Komax style static mixer has been determined to suffice, in this regard.

Figure 2:
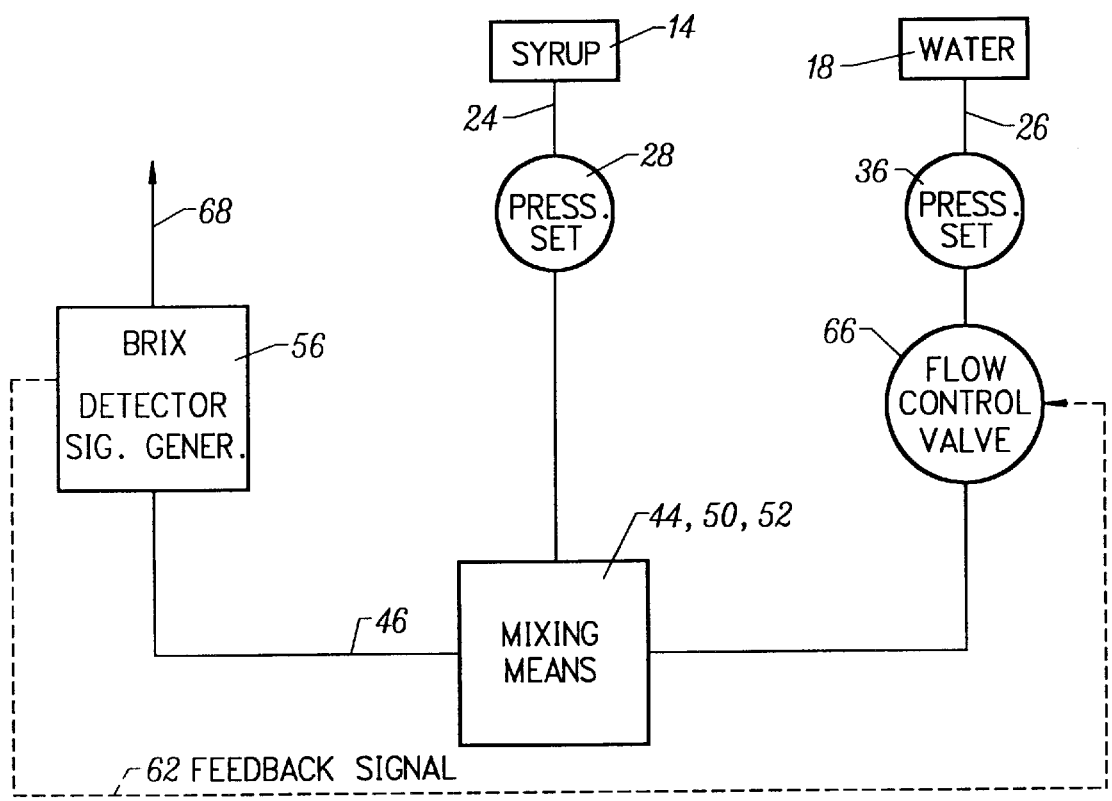
FIG. 2 is a functional block diagram depicting the operation of the present invention.

The present system also includes means 54 for determining the degree of Brix in mixture stream 46. Means 50 for determining Brix of mixture or product stream 46 includes a process refractometer 56. For example, a refractometer sold under model number UR-15 by Maselli of Milan, Italy is suitable in the present application. As such, refractometer 56 includes means for setting a particular desired Brix value for mixture stream 46. In addition, means 60 is also included in refractometer 56 for detecting the actual value of mixture stream 46. Mixture stream 46 is regulated by a signal 62 generated by refractometer 56 through a comparitor 64 within refractometer 56. Comparitor 64, essentially, determines the difference between the actual Brix value and the desired Brix value for process or mixture stream 46. Signal 62 is sent to a control valve 66 which lies in the water base liquid stream 26. Control valve 66 may be of the type NTC 7020 manufactured by Samson of Frankfort, Germany. Valve 66 employs signal 62 which may be a pneumatic signal. However, signal 52 may also be electrical, sonic, and the like. In any case, flow control valve 66 regulates the flow of water based liquid stream 26 through node 44 and into mixture stream 46. Thus, the Brix value detected by refractometer 56 of mixture stream 46 matches the Brix value desired, set means 54 therein. Exit stream 68 is further controlled by restrictor valve 70 which determines the final flow rate of exit stream 68, directed to containerization of the product stream. FIG. 2 represents a functional summary of the schematic flow described in detail in FIG. 1.

In operation, liquid sugar and water based liquids are provided in two separate streams 26 and 28, deriving from reservoirs 12 and 16, respectively. Optional heaters 72 and 74 raise the temperature of liquid sugar component 14 and water based liquid 18 to a suitable level, if necessary. For example, 130 to 140 degrees Fahrenheit is a typical temperature level for liquid sugar and water based components 14 and 18, respectively. Pressure regulating valves 28 and 36, set the pressure of liquid sugar stream 24 and water based liquid stream 26, respectively, such that the water based stream 26 is at a higher pressure, i.e. five pounds per square inch. Means for applying pressure to streams 24 and 26 are depicted by pumps 20 and 22, but may be generated by gravity or other means. Streams 24 and 26 meet at node 44 where mixing occurs between the streams. Static mixers 50 and 52 further mix exit stream 46 until the same reaches refractometer 56. Refractometer 56 determines the Brix of exit stream 46 and generates a pneumatic signal 62 relative to a Brix setting, which is sent back to control valve 66. Signal 62 adjusts the flow orifice of control valve 66, which, in turn, changes flow rate of water based liquid stream 26. In this manner, dilution of the liquid sugar stream 24 is controlled, which eventually results in determination of the Brix value of exit stream 46. For example, if the Brix at refractometer 56 is too low, control valve 66 is slightly closed increasing the Brix at refractometer 56, and vice versa. The flow rate of exit stream 68 from refractometer 56 is controlled by restrictor valve 70 as desired.

The following examples are intended to illustrate the invention sought for patenting herein, however, they are not deemed to restrict or narrow the invention in any manner.

EXAMPLE 1

Figure 4:
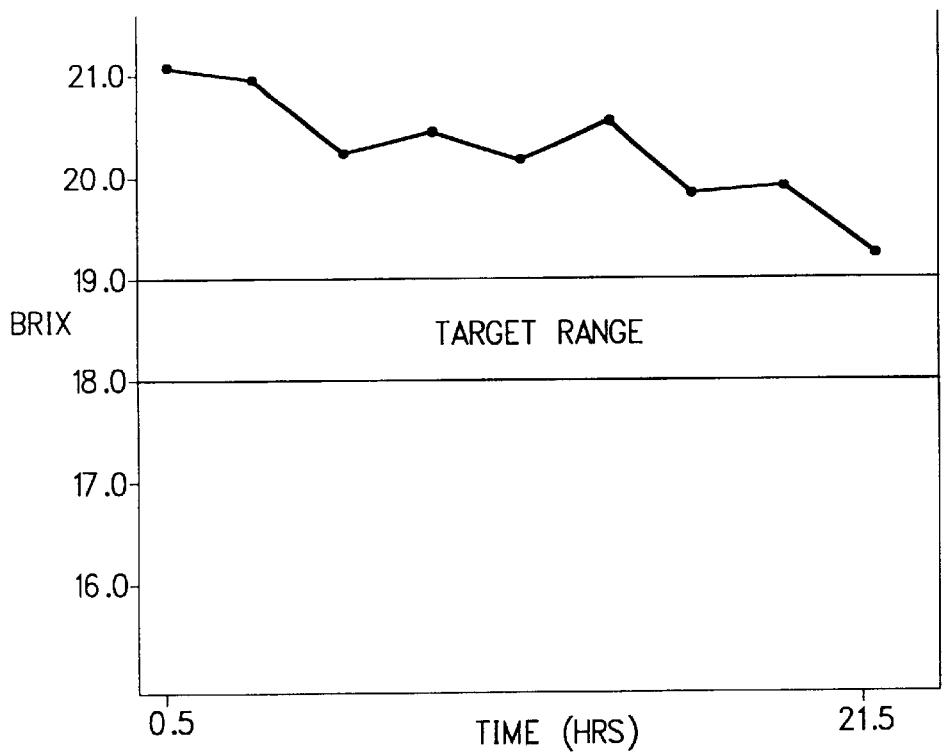
FIG. 4 is a graph showing the determination of Brix in a typical system utilizing the prior art devices.

The Brix level of the mixture of sucrose and water streams was conducted using conventional blending methods in a canned fruit plant in Yakima, Wash. The water pressure of the water stream was 10 psi higher than the sucrose stream. Both streams were at about 130 degrees Fahrenheit. The fruit employed with the mixture stream of sucrose and water was sliced pears. The target Brix level of the mixture stream to be placed with the canned pears was between 18.0 and 19.0. Over a period of 21½ hours, the Brix level varied between 19.3 and 21.1. It should be noted that the ideal target Brix 18.5 and was never achieved. Thus, sucrose was employed unnecessarily in producing the mixture stream of sucrose and water. FIG. 4 represents a graphical showing of the results of this test.

EXAMPLE 2

Figure 5:
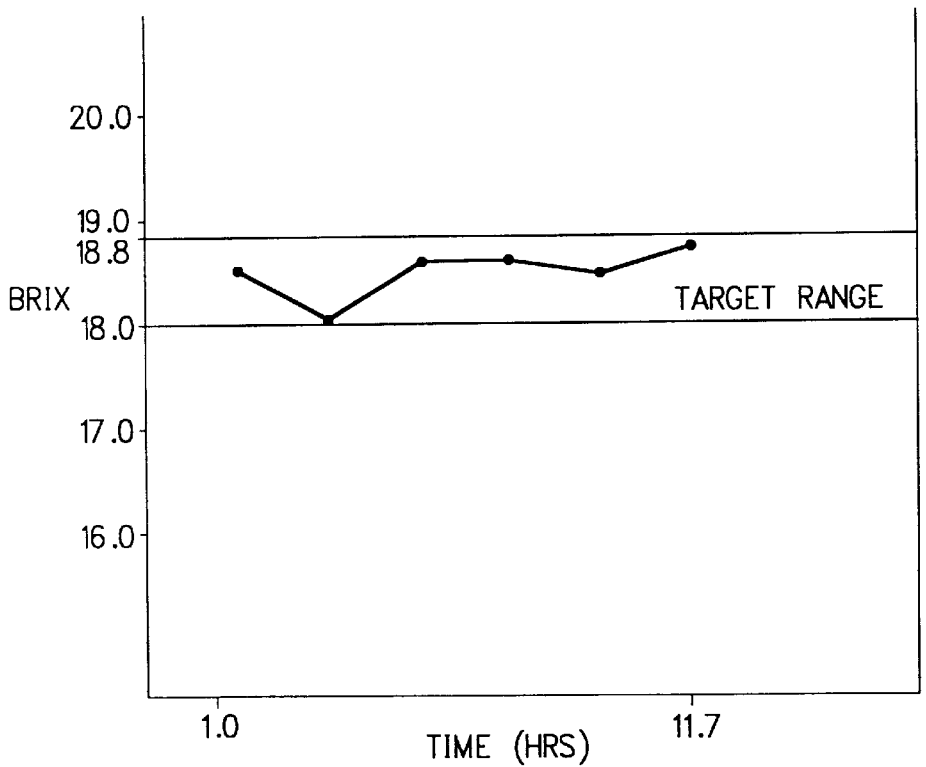
FIG. 5 is a graph showing the determination of Brix in the mixture stream of the apparatus of the present invention.

The blending apparatus of the present invention was employed in the same situation as indicated with respect to Example 1. Again, the Brix range desired was set between 18.0 and 18.8. The ideal Brix, or target Brix, was set at 18.4. Over a period of 10.7 hours, the Brix range of the exit stream varied between 18.0 and 18.7. Thus, very little excess sucrose was employed in the test conducted in this example. FIG. 5 represents a graphical depiction of the results of Example 2.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A liquid sugar syrup and water based liquid blending apparatus, comprising:
   a. a first conduit for said liquid sugar;
   b. a second conduit for said water based liquid;
   c. a third conduit connected to said first and second conduits to provide a mixture stream of the liquid sugar and water based liquid;
   d. means for applying pressure to the liquid sugar in said first conduit;
   e. means for applying pressure to the water based liquid in said second conduit at a greater value than said pressure applied to said liquid sugar in said first conduit;
   f. means for setting a particular desired Brix value of the mixture stream containing the liquid sugar and water based liquid;
   g. means for detecting the actual value of the Brix in the mixture stream; and
   h. comparitor means for regulating the flow of the water based liquid in said first conduit to essentially set the Brix of the mixture stream to said particular desired Brix valve, by determining the difference between said particular desired Brix value and said actual Brix value of the mixture stream, said comparitor means including a valve located in said second conduit to regulate the flow of the water based liquid.

2. The apparatus of claim 1 in which said valve of said comparitor means is pneumatically operated.

3. The apparatus of claim 1 which additionally comprises a static mixer located in said third conduit.

4. The apparatus of claim 1 which additionally comprises means for selectively heating said liquid sugar and water based liquid.

5. The apparatus of claim 1 in which said means for detecting the actual Brix value of the mixture stream comprises a refractometer.

6. The apparatus of claim 5 in which said valve of said comparitor means is pneumatically operated.

7. The apparatus of claim 6 which additionally comprises a static mixer located in said third conduit.

8. The apparatus of claim 7 which additionally comprises means for selectively heating said syrup and water.

9. The apparatus of claim 8 in which said static mixer is said third conduit is a first static mixer and which additionally comprises a second static mixer in said third conduit.

10. The apparatus of claim 1 which additionally comprises restrictor value means for controlling the flow rate of said mixture stream of the liquid sugar and the water based liquid.

11. The apparatus of claim 10 which additionally comprises means for selectively heating said liquid sugar and water based liquid.

12. The apparatus of claim 11 in which said means for detecting the actual Brix value of the mixture stream comprises a refractometer.

13. A liquid sugar syrup and water based liquid blending apparatus, comprising:
   a. a first conduit for said liquid sugar;
   b. a second conduit for said water based liquid;
   c. a third conduit connected to said first and second conduits to provide a mixture stream of the liquid sugar and water based liquid;
   d. means for applying pressure to the liquid sugar in said first conduit;
   e. means for applying pressure to the water based liquid in said second conduit at a value substantially equal to said pressure applied to said liquid sugar in said first conduit;
   f. means for setting a particular desired Brix value of the mixture stream containing the liquid sugar and water based liquid;
   g. means for detecting the actual value of the Brix in the mixture stream; and
   h. comparitor means for regulating the flow of the water based liquid in said first conduit to essentially set the Brix of the mixture stream to said particular desired Brix valve, by determining the difference between said particular desired Brix value and said actual Brix value of the mixture stream, said comparitor means including a valve located in said second conduit to regulate the flow of the water based liquid.

* * * * *